Patented June 14, 1949

2,472,812

UNITED STATES PATENT OFFICE 2,472,812

ESTERS OF ALPHA-FLUOROMETHYL ACRYLIC ACIDS

Joseph B. Dickey, Rochester, N. Y., assignor to Eastman Kodak Company, Rochester, N. Y., a corporation of New Jersey No Drawing. Application April 27, 1946, Serial No. 665,621

4 Claims. (Cl. 260—486)

This invention relates to acrylic acid and derivatives containing fluorine atoms and more particularly to alpha-difluoromethyl, alpha-difluorochloromethyl- and alpha-trifluoromethyl-acrylic acids and derivatives. It also relates to a method for their preparation.

It is known that esters of methacrylic acid can be prepared by treating acetone cyanhydrin with fuming or concentrated sulfuric acid, and subsequently heating the reaction mixture with a monohydric alcohol. It is also known that methacrylamide can be prepared by conducting the reaction of fuming or concentrated sulfuric acid under slightly different conditions of time and temperature, in the presence of sulphur, and that methacrylonitrile can be prepared by pyrolysis of cyano isopropyl acetate. I have now found that the alpha-difluoromethyl-, alpha-difluorochloromethyl- and alpha-trifluoromethyl- acrylic acids and various ester, amide and nitrile derivatives can be prepared by treating the difluoro, difluorochloro and trifluoro derivatives of acetone cyanhydrin with fuming or concentrated sulfuric acid, thionyl chloride, alkylsulfuric acid or by pyrolysis of the difluoro, difluorochloro and trifluoro derivatives of cyano isopropyl acetate. My new fluoromethylacrylic acids and derivatives can be polymerized to give resinous products having higher melting points and greater stability to heat than the resins obtained by polymerizing the corresponding non-fluorinated methacrylic acids and derivatives.

It is, accordingly, an object of my invention to provide new alpha-fluoromethyl acrylic acids and derivatives. A further object is to provide a process for preparing such compounds. Other objects will become apparent hereinafter.

In accordance with my invention, I prepare compounds which can be represented by the general formula:

I 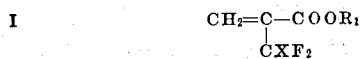

wherein $R_1$ represents a hydrogen atom, an alkali or alkaline earth atom, for example, an atom of sodium, potassium, lithium, caesium, calcium, barium, an alkyl group having from 1 to 4 carbon atoms in the chain, for example, methyl, ethyl, propyl, isopropyl, butyl, sec.-butyl, isobutyl, tert.-butyl, β-acetamino-ethyl, β-acetaminopropyl, an aryl group of the benzene series, for example, phenyl, benzyl, a cycloalkyl group, for example, cyclohexyl, a heterocyclic group, for example, tetrahydrofurfuryl, and X represents an atom of hydrogen, an atom of fluorine or an atom of chlorine, by the process of treating fluoroacetone cyanhydrins having the general formula:

II 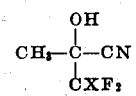

wherein X represents an atom of hydrogen, fluorine or chlorine, with an alkyl hydrogen sulfate, for example, methyl hydrogen sulfate, ethyl hydrogen sulfate, butyl hydrogen sulfate, and the like, or with strong sulfuric acid, followed by heating with an alcohol, to obtain the organic esters from which can be prepared by hydrolysis the corresponding free acids and salts of the acids. Antipolymerization catalysts, for example, copper and its salts, sulphur, hydroquinone may also be added to the reaction mixture.

To obtain the compounds of my invention which can be represented by the general formula:

III 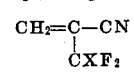

wherein X represents an atom of hydrogen, fluorine or chlorine, the intermediate fluoroacetone cyanhydrins represented by Formula II are treated with thionyl chloride or pyrolyzed by heating at about 140°–180° C.

To obtain the compounds of my invention which can be represented by the following general formula:

IV 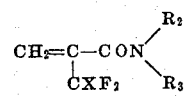

wherein $R_2$ and $R_3$ each represent an atom of hydrogen, an alkyl group having from 1 to 4 carbon atoms, for example, methyl, ethyl, propyl, isopropyl, butyl, sec.-butyl, isobutyl, tert.-butyl, an aryl group of the benzene series, for example, phenyl, benzyl, a cycloalkyl group, for example, cyclohexyl or a heterocyclic, for example tetrahydrofurfuryl, and X represents an atom of hydrogen, fluorine or chlorine, the intermediate fluoroacetone cyanhydrins represented by Formula II are treated with fuming sulfuric acid or concentrated sulfuric and sulfur to obtain the compounds wherein both $R_2$ and $R_3$ are hydrogen, or the intermediate fluoromethacrylic compounds represented by Formula I are converted to the acid chlorides by treating with phosphorus pentachloride and the latter reacted with primary and secondary amines to obtain the compounds wherein $R_2$, $R_3$ or both are organic radicals. The intermediate fluoroacetone cyanhydrins represented by Formula II can be prepared by treating the fluoro substituted ketones with sodium cyanide and a mineral acid or by reacting the ketones with liquid hydrogen cyanide. Catalysts such as piperidine, triethylamine and similar kinds of compounds promote the reaction. The preparations of such intermediates are described by Swarts, Bull. Acad. roy. Belgique, 689, 721 (1926).

The following examples will serve to illustrate the compounds of my invention and the methods of their preparation.

*Example I.—Alpha-difluoromethylacrylonitrile*

24 grams of 1,1-difluoroacetone cyanhydrin were heated with 27 grams of thionyl chloride on a steam bath under a reflux condenser for a period of about six hours. The excess acid chloride and acids formed in the reaction were removed by washing the reaction mixture with aqueous sodium bicarbonate, after which the mixture was fractionated to give alpha-difluoromethylacrylonitrile and alpha-difluorochloro isobutyronitrile. In a similar manner and employing equivalent amounts of trifluoroacetone cyanhydrin and difluorochloroacetone, there were prepared the corresponding alpha trifluoromethylacrylonitrile and alpha - difluorochloromethylacrylonitrile. Compounds of the above type can also be prepared by pyrolysis at about 150° C. of compounds having the general formula:

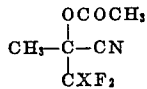

wherein X represents a hydrogen atom, a fluorine atom or a chlorine atom.

*Example II.—Alpha-trifluoromethylacrylamide*

28 grams of 1,1,1-trifluoroacetone cyanhydrin were mixed at about 80° C. with 20 grams of 95–98 per cent sulfuric acid containing some sulfur. The resulting viscous mass was heated at 120–140° C. for one hour, cooled, poured into 150 cc. of water and filtered. The acid solution was neutralized with powdered calcium carbonate and the mixture then filtered hot. There was obtained by evaporation and crystallization a good yield of alpha-trifluoromethylacrylamide. In place of 1,1,1-trifluoroacetone cyanhydrin in the above example, there can be substituted equivalent amounts of 1,1-difluorochloroacetone cyanhydrin or 1,1-difluoroacetone cyanhydrin to obtain alpha - difluorochloromethylacrylamide and alpha - difluoromethylacrylamide. Similar results can be obtained by substituting the 95–98 per cent sulfuric acid with oleum.

*Example III.—Alpha-difluoromethyl-methylacrylate*

50 grams of 1,1-difluoroacetone cyanhydrin were added with stirring to 75 grams of methyl hydrogen sulfate, the temperature being slowly raised meanwhile to about 95° C. A small amount of copper acetate was used as a stabilizer. When the addition had been completed, the temperature was raised to and maintained at 100° C. for a period of about one hour and then at 135–140° C. for a period of another hour. To this mixture, there were added 10–15 cc. of water, and the whole refluxed for about 10–15 hours. Water was then added to the mixture, the oily layer being separated out and distilled to give alpha-difluoromethyl-methyl acrylate, a clear colorless liquid. Alpha-trifluoromethyl-methyl acrylate or alpha-difluorochloromethyl-methylacrylate can be obtained by replacing the 1,1-difluoroacetone cyanhydrin employed in the above example with 1,1,1-trifluoroacetone cyanhydrin or 1,1,1-difluoroacetone cyanhydrin.

*Example IV.—Alpha-trifluoromethyl-ethylacrylate*

Approximately 100 grams of 1,1,1-trifluoroacetone cyanhydrin were added to 95 grams of concentrated sulfuric acid, keeping the temperature meanwhile below 75° C. To this mixture, there were added 60 cc. of ethanol together with copper sulfate to prevent polymerization. The mixture was heated on a water bath for about 15–20 hours. The product was then purified by washing with sodium bicarbonate and isolated by distillation. The alpha-trifluoromethyl-ethylacrylate was obtained as a colorless liquid. The difluoromethyl-ethylacrylate can be prepared in a similar manner. In place of ethanol in the above example, there can be substituted an equivalent amount of methanol, normal- and iso-propanol, the various butanols, trichloro-tert.-butanol, trifluoroethanol, cyclohexanol, β-methoxyethanol, ethylene glycol, benzyl alcohol, tetrahydrofurfuryl alcohol, and similar alcohols, to give the corresponding esters of difluoromethyl-, difluorochloromethyl- and trifluoromethyl-acrylic acids.

*Example V.—Alpha-difluoromethylacrylamide*

24 grams of 1,1-difluoroacetone cyanhydrin and 20 grams of sulfuric acid, containing 0.2 per cent of free sulphur trioxide, were mixed together and allowed to flow through a coil, having a length of about 250 cms. and a cross-sectional area of about 0.10 square cms., immersed in an oil bath maintained at about 150° C., at a rate adjusted so that the time of transit was about 130 seconds. A good yield of alpha-difluoromethylacrylamide was obtained. Alpha-trifluoromethyl - acrylamide and alpha-difluorochloromethylacrylamide can be prepared by the same method by substituting the 1,1-difluoroacetone cyanhydrin in the above example with 1,1,1-trifluoroacetone cyanhydrin or 1,1,1-difluorochloroacetone cyanhydrin.

*Example VI.—Alpha-difluoromethylacrylic acid*

13.6 grams of alpha-difluoromethyl-methylacrylate were added dropwise to 100 cc. of water containing 0.1 gram of hydroquinone and 2.2 grams of sodium hydroxide. The reaction mixture was warmed with stirring, until the ester had dissolved. The water was then removed under reduced pressure and the sodium salt of the acid recovered as a white solid. The free acid was obtained by adding an equivalent amount of a mineral acid. Trifluoromethylacrylic acid and difluorochloromethylacrylic acid can be prepared in a similar manner.

*Example VII.—Alpha-difluoromethylacrylic acid chloride*

The sodium salt prepared as described in Example 6 was treated with one equivalent of phosphorus pentachloride, in the presence of copper acetate obtaining thereby the acid chloride as a clear, colorless liquid. Further purification was accomplished by distilling the reaction mixture. In a similar manner, there can be prepared the corresponding alpha-trifluoromethyl- or the difluorochloromethyl-acrylic acid chlorides. These new acid chlorides can be used as intermediates for the preparation of various amides and esters.

Example VIII.—Alpha-trifluoromethyl-N-methylacrylamide 15.8 grams of alpha-trifluoromethyl acrylylchloride were dissolved in 200 cc. of dry benzene, the solution cooled to about 0° C. and 6.2 grams of dry methylamine metered into the solution. The mixture was allowed to warm to room temperature, after which it was extracted with water to remove methylamine hydrochloride. The solution was then concentrated by evaporation of most of the benzene and the compound, alpha-trifluoromethyl - N - methylacrylamide was obtained in the form of crystals. Further purification was accomplished by recrystallizing from acetonitrile. In place of the trifluoromethylacrylylchloride in the above example, there can be substituted equivalent amounts of alpha-difluoromethylacrylylchloride or alpha-difluorochloromethylacrylylchloride to obtain the corresponding acrylamide compounds. In place of the methylamine in the above example, there can be substituted ammonia, ethylamine, β-hydroxyethylamine, β-methoxyethylamine, difluoroethylamine, butylamine, tert.-butylamine, cyclohexylamine, aniline, p-carboxyamidoaniline, β-cyanoethylamine, dimethylamine, tetrahydrofurfurylamine, bis-trifluoroethylamine, and similar kind of amines, to obtain the acrylamide compounds corresponding thereto.

Example IX.—Alpha-difluoromethyl-N-β-acetaminoethylacrylamide 14 grams of alpha-difluoromethyl acrylylchloride were reacted with 21 grams of β-acetaminoethylamine in a solution of dry benzene following the procedure described in the preceding example. The corresponding trifluoromethyl and the difluorochloromethyl compounds can be prepared by replacing the acid chloride in the above example with equivalent amounts of alpha-trifluoromethylacrylylchloride or alpha-difluorochloromethyl-acrylylchloride.

Example X.—Alpha-difluorochloromethyl-N-β-trifluoroacetaminomethyl acrylamide 17.4 grams of alpha-difluorochloromethyl acrylylchloride were reacted with 20 grams of trifluoroethylamine in a solution of dry benzene following the procedure described in Example VIII. In place of alpha-difluorochloromethylacrylylchloride, there can be substituted equivalent amounts of alpha-trifluoromethyl acrylylchloride or alpha-difluoromethyl acrylylchloride to obtain alpha-trifluoromethyl - N - β - trifluoroacetaminoethyl acrylamide or alpha-difluoromethyl - N - β - trifluoroacetaminoethyl acrylamide.

What I claim is:
1. The compounds having the general formula:

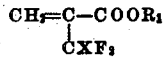

wherein $R_1$ represents an alkyl group having from 1 to 4 carbon atoms, and $X$ represents a member selected from the group consisting of an atom of hydrogen, and an atom of fluorine.
2. Alpha-difluoromethyl-methylacrylate.
3. Alpha-trifluoromethyl-ethylacrylate.
4. Alpha-difluoromethyl-ethylacrylate.

JOSEPH B. DICKEY.

REFERENCES CITED

The following references are of record in the file of this patent:

UNITED STATES PATENTS

| Number | Name | Date |
| --- | --- | --- |
| 2,042,458 | Crawford | June 2, 1936 |
| 2,056,771 | Crawford | Oct. 6, 1936 |
| 2,356,075 | Migrdichian | Aug. 15, 1944 |

OTHER REFERENCES

Bergmann et al., "Journal of American Chemical Society," vol. 63 (1941), page 1438.

Guye, Jour. de Chim. Phys., vol 17 (1919), page 23.

Berthet, "Chemical Abstracts," vol. 37 (1943), page 3400.

Hurd et al., J. Org. Chem., vol. 10, pages 441–448 (1945).